(12) United States Patent
Chatfield et al.

(10) Patent No.: US 8,719,287 B2
(45) Date of Patent: May 6, 2014

(54) APPARATUS AND METHOD FOR DYNAMICALLY SELECTING COMPONENTIZED EXECUTABLE INSTRUCTIONS AT RUN TIME

(75) Inventors: Michael Robert Chatfield, Vancouver (CA); Bonnie Yuk-Yee Cheng, Coquitlam (CA); Kevin Kyle Venkiteswaran, Vancouver (CA); Clarence William Stad, New Westminster (CA)

(73) Assignee: Business Objects Software Limited, Dublin (IE)

( * ) Notice: Subject to any disclaimer, the term of this patent is extended or adjusted under 35 U.S.C. 154(b) by 955 days.

(21) Appl. No.: 11/849,156

(22) Filed: Aug. 31, 2007

(65) Prior Publication Data

US 2009/0063415 A1    Mar. 5, 2009

(51) Int. Cl.
*G06F 17/30* (2006.01)

(52) U.S. Cl.
USPC ............................ 707/758; 707/705; 715/200

(58) Field of Classification Search
USPC ................ 707/100, 769, 771, 608, 705, 758; 713/164–167, 182–186; 715/965, 968, 715/200
See application file for complete search history.

(56) References Cited

U.S. PATENT DOCUMENTS

| | | | |
|---|---|---|---|
| 2003/0088778 A1* | 5/2003 | Lindqvist et al. | 713/182 |
| 2003/0182310 A1* | 9/2003 | Charnock et al. | 707/104.1 |
| 2007/0130109 A1 | 6/2007 | King et al. | |
| 2007/0136326 A1 | 6/2007 | McClement | |
| 2007/0214425 A1* | 9/2007 | Bala et al. | 715/764 |

FOREIGN PATENT DOCUMENTS

| | | |
|---|---|---|
| EP | 1811441 | 7/2007 |
| WO | WO 2006/036972 | 4/2006 |

OTHER PUBLICATIONS

Excerpt from Book entitled "Business Objects XI: The COmplete Reference", by Howson, Published on Jun. 27, 2006.*
Article entitled "Business Objects XI Release 2" by Business Objects, dated Dec. 2, 2005.*
Business Objects, S.A., EP Application No. 08162888.5. Search Report (Apr. 1, 2009).

* cited by examiner

*Primary Examiner* — Mahesh Dwivedi
(74) *Attorney, Agent, or Firm* — Mintz Levin Cohn Ferris Glovsky and Popeo, P.C.

(57) ABSTRACT

A computer readable storage medium includes executable instructions to receive a request for an action. An action context is received where the action context includes an application requesting the action. A set of metadata is searched for metadata corresponding to the action, where the search is limited by the action context. Selected metadata for the action is inserted into a collection. The selected metadata is a result of searching the set of metadata. The selected metadata includes a reference to the set of executable instructions that implements the action and a description of the action. The collection is then returned.

26 Claims, 10 Drawing Sheets

APPARATUS AND METHOD FOR DYNAMICALLY SELECTING COMPONENTIZED EXECUTABLE INSTRUCTIONS AT RUN TIME

BRIEF DESCRIPTION OF THE INVENTION

This invention relates generally to information processing. More particularly, this invention relates to searching for and retrieving executable instructions and associated data.

BACKGROUND OF THE INVENTION

Business Intelligence (BI) generally refers to software tools used to improve decision-making. These tools are commonly applied to financial, human resource, marketing, sales, customer and supplier analyses. More specifically, these tools can include: reporting and analysis tools to present information, content delivery infrastructure systems for delivery and management of reports and analytics, data warehousing systems for cleansing and consolidating information from disparate sources, and data management systems to collect, store, and manage raw data.

BI tools with modular architectures are common. The executable files built on modular designs scale in size as features are added. Also, in a modular BI tool, features may be added while the general interface is preserved. Because each feature is ideally independent of the other features, the addition of multiple features to a BI tool may lead to redundant code in the tool. If left unchecked, this can lead to unwieldy executable files that defeat an advantage of modular design.

Redundant code can be eliminated through componentization. Componentization is an approach in the field of software engineering which considers how executable instructions within programs are divided up and arranged. Componentized code was developed out of the desire to create portions of code that are reusable, interchangeable, better tested and the like. A set of executable instructions can be split-up into components. A component can be an object, a group of objects, one or more subsystems, a library and the like.

An optimal componentized system reduces the amount of redundant code. A challenge associated with reducing the amount of redundant code is to account for the presence or absence of a component.

In view of the above, it is desirable to provide improved techniques for determining how portions of executable instructions are divided and arranged. It would also be desirable to enhance software frameworks with improved techniques to handle componentized software.

SUMMARY OF INVENTION

The invention includes a computer readable storage medium with executable instructions to receive a request for an action. An action context is received where the action context includes an application requesting the action. A set of metadata is searched for metadata corresponding to the action, where the search is limited by the action context. Selected metadata for the action is inserted into a collection. The selected metadata is a result of searching the set of metadata. The selected metadata includes a reference to the set of executable instructions that implements the action and a description of the action. The collection is then returned.

The invention also includes a computer readable storage medium with executable instructions to receive a request for an action from a user at a client, where the request is for an action that is suitable in an action context. A query to a metadata source is formed for the action. The query includes a first parameter based on the rights of the user and a second parameter based on a criterion in the request for the action. A set of results is received from the query, where the set of results from the query includes metadata for a suitable action. The metadata for the suitable action is returned.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
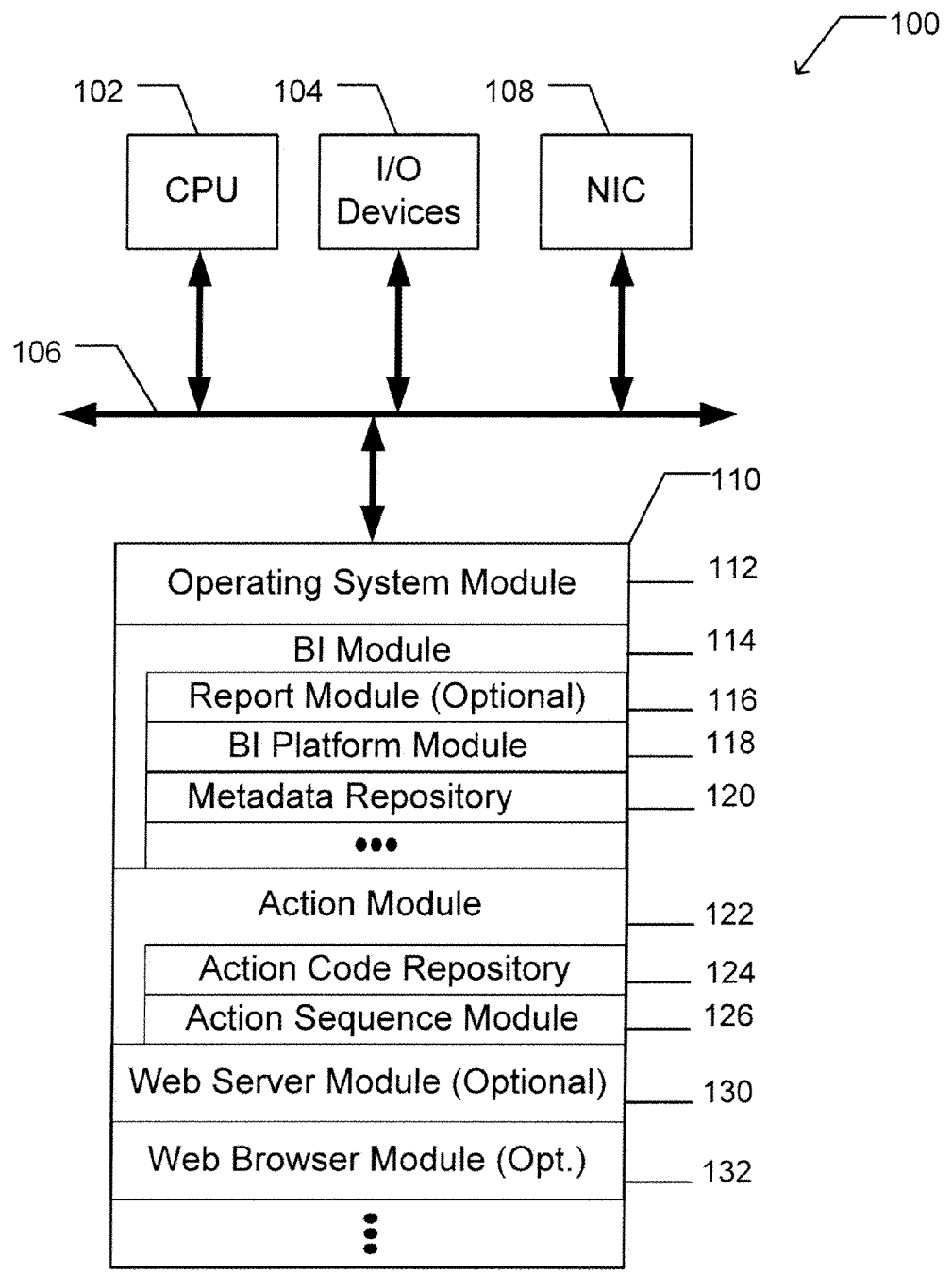
FIG. 1 illustrates a computer constructed in accordance with an embodiment of the invention.

The following terminology is used while disclosing embodiments of the invention:

An action is a part of a workflow. An action may be a part of a workflow that a user initiates in a client application. For example, view, modify, schedule, and create are considered actions. An action can be defined by executable instructions divided into components and optionally associated with metadata in information objects. At a metadata level, an action is a set of metadata (e.g. an information object) that contains a location for the executable instructions that implement the action and optionally the associated GUI elements. The GUI element may be executable instructions or markup languages that generate a webpage for a browser—e.g. Java script XML HTML. In an embodiment, an action is comprised of an information object, a Java class, and a JavaServer Pages (JSP) page. In this example, the information object is metadata to executable instructions implementing the action in the Java class and JSP page, while the JSP page is a GUI element used to invoke the Java class.

An action set is a group of actions. Action sets are used to combine actions together and to display them as a logical unit. Two types of action sets are single page and multi-page action sets. The main difference between these two types is how they are presented to the user. For both types one or more actions may be included in a portion of a GUI, such as a window, pane, icon, button, menu or the like. A multi-page action set looks like a wizard with multiple sequentially presented pages. Each action is displayed on its own page. A single page action set looks like a single page with two or more actions present. In the context of action sets, a page can be a portion of a GUI.

Context or action context is a set of conditions under which an action is requested or invoked. Context can be used to limit the selection from all actions to one or more suitable actions. Context may be determined by many factors including: the target content (e.g., BI content, data), the application requesting the target content, the rights for a user, the intended usage of the target content, the situation of the target content, past actions invoked, the locale of the BI tool, and the computer language used to create a GUI for a client.

A data source is an information resource. Data sources include sources of data that enable data storage and retrieval. Data sources may include databases, such as, relational, transactional, hierarchical, multidimensional (e.g., OLAP), object oriented databases, and the like. Further, data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources may also include a data source where the data is not stored like data streams, broadcast data, and the like.

An information object is a collection of one or more pieces of metadata. The metadata describes one or more aspects of a component in a system. In a BI system the underlying component is one or more pieces of metadata (e.g., another information object, a collection of information objects defining a BI tool), a file, a resource (e.g. data source, report engine), an entity (e.g. user), aspect of a BI system and the like. The information object can be implemented in binary or human readable format. In an embodiment, the information objects are implemented in eXtensible Markup Language (XML).

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 provides connectivity to a network (not shown), thereby allowing the computer 100 to operate in a networked environment. In an embodiment, one or more data sources (not shown) are coupled to computer 100 via NIC 108.

A memory 110 is also connected to the bus 106. In an embodiment, the memory 110 stores one or more of the following modules: an operating system module 112, a business intelligence (BI) module 114, a report module 116, a BI Platform module 118, a metadata repository 120, an action module 122, an action code repository 124, an action sequence module 126, a webserver module 130 and a web browser module 132.

The operating system module 112 may include instructions for handling various system services, such as file services or for performing hardware dependant tasks.

The BI module 114 includes executable instructions to perform BI related functions on computer 100 or across a wider network. BI related functions include generating reports, performing queries, performing analyses, and the like. The BI module 114 can include one or more sub-modules selected from the report module 116, BI Platform module 118 and metadata repository 120. The report module 116 is optional. It includes instructions for generating reports, viewing a report, performing query and analysis, and the like. The report module 116 includes executable instructions to access a data source (not shown). The report module 116 includes instructions to accessed data locally or remotely.

The BI Platform module 118 includes instructions for handling various services that are consumed by one or more BI applications. These services include metadata management, scheduling, alerting, and the like. The metadata management includes the management of the metadata repository 120, Metadata is data describing data or an aspect of a system. Metadata includes secondary information that describes or augments a primary set of data or an entity in a system, such as, a set of instructions, a user and the like. The repository 120 is a data source storing metadata for components of a BI system. The repository 120 is a storage and processing resource for information about entities in a BI system. The executable instructions in other modules may access the repository to retrieve or add metadata. In some embodiments this metadata is stored as information objects. The metadata repository 120 can be implemented in accordance with any number of techniques, including those described in the following pending, commonly owned patent application, which is incorporated by reference herein in its entirety: "Apparatus and Method for Defining Relationships between Component Objects in a Business Intelligence System", application Ser. No. 11/304,980, filed Dec. 14, 2005.

The action module 122 includes executable instructions to manage an action based BI system. The action module 122 directs the flow of requests for content (e.g., documents, documents with saved data, documents with live data, and data). The module 122 combines the content with GUI elements to create pages of content with embedded actions. The action module 122 can include sub-modules like the action code repository 124 and the action sequence module 126. The action code repository 124 stores the executable instructions that define actions and their associated GUI elements. The action sequence module 126 includes executable instructions to handle the invocation of a set of actions, the chaining of actions, error handling and the like.

The optional webserver module 130 includes executable instructions to accept content requests from clients and send the content to the clients. The web browser module 132 is optional. When present it interacts with the action module 122 through the webserver module 130. The action sequence module 126 provides a graphical user interface to display content from the web browser module 132. The web browser module 132 includes executable instructions to enable the user to interact with content, request additional content, and send commands to executable instructions in other modules.

The executable modules stored in memory 110 are exemplary. Other modules could be added, such as, a graphical user interface module. It should be appreciated that the functions of the modules may be combined. In addition, the functions of the modules need not be performed on a single machine. Instead, the functions may be distributed across a network, if desired. Indeed, the invention is commonly implemented in a client-server environment with various components being implemented at the client-side and/or the server-side. It is the functions of the invention that are significant, not where they are performed or the specific manner in which they are performed.

Figure 2:
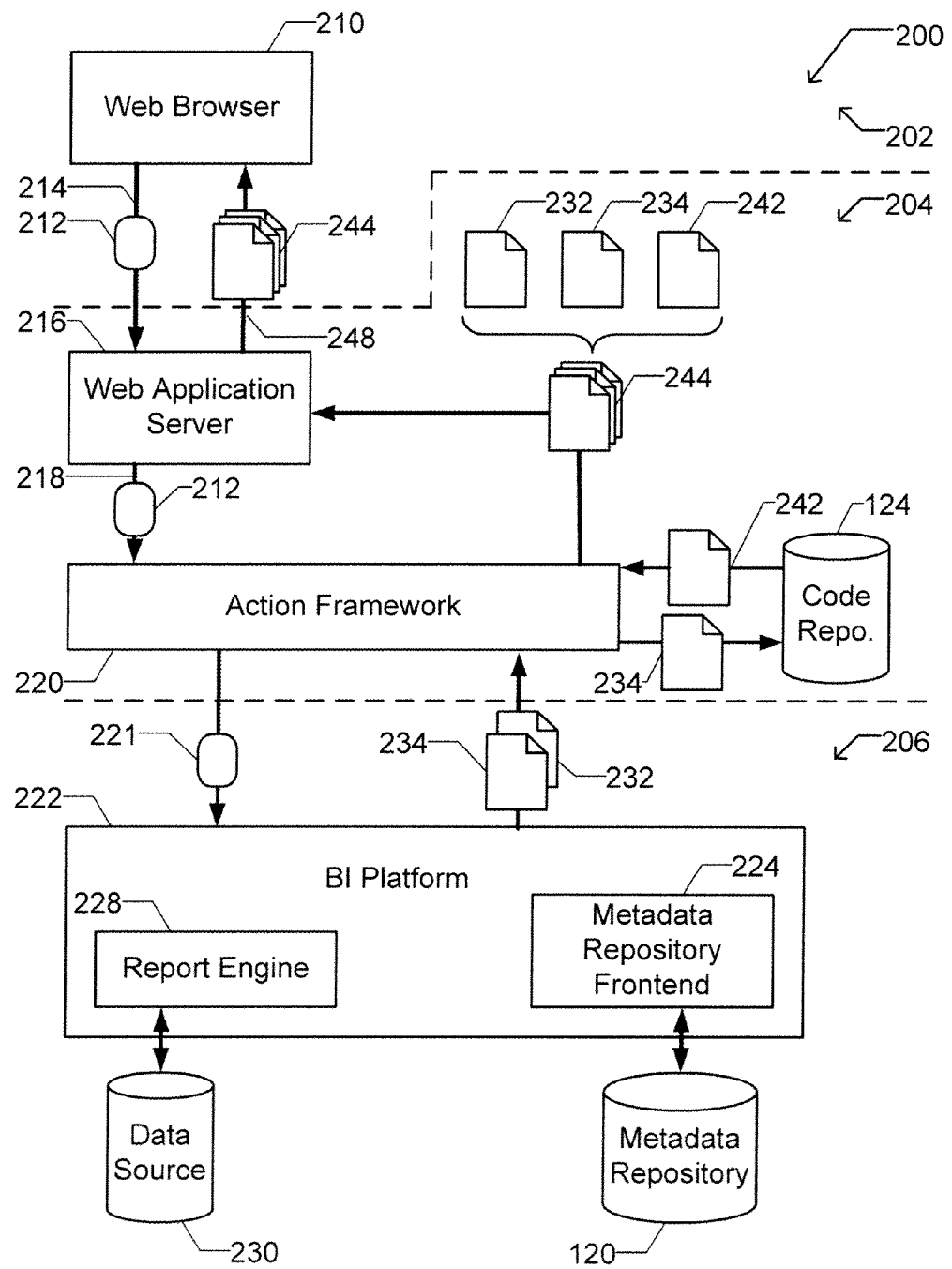
FIG. 2 illustrates an architecture diagram showing components of an action based BI system in accordance with an embodiment of the invention.

FIG. 2 illustrates an architecture for a BI system 200 in accordance with an embodiment of the invention. The BI system 200 includes components designed to cooperate to provide business intelligence functions using a componentized framework. The BI system 200 is divided into a client layer 202, a server layer 204 and a platform layer 206. The server layer 204 overlies the platform layer 206 and separates it from the client layer 202. The division into layers permits a distributed architecture.

Included in BI System 200 is a web browser 210 defined by executable instructions in the web browser module 132. The web browser 210 sends a request 212 for one or more suitable actions via channel 214 to web application server 216. The web application server 216 is defined by executable instructions in the web server module 130. The web application server 216 sends the request via channel 218 to the action framework 220. The action framework is defined by the action module 122 and the action sequence module 126. The action framework 220 parses and, if needed, augments the request. The augmented request 221 is sent to the BI platform 222 in the platform layer 206.

The BI platform 222 handles various services that are consumed by one or more BI applications. The platform will coordinate the servicing of the request 221. The BI platform 222 is defined by the BI module 114 and its sub-modules. The BI platform 222 includes a metadata repository frontend 224. The frontend 224 may be an application programming interface. In an embodiment, all applications and entities can query the metadata repository. The metadata repository frontend 224 takes the request 221 and queries the metadata repository 120. The queries incorporate the appropriate data from the request to search for a list of suitable actions.

The selected metadata for the suitable action(s) 234 is returned from the BI platform 222. This metadata varies with embodiments but includes a list of the one or more suitable actions and information on how to invoke the actions. In an embodiment, the metadata includes: a reference (e.g. URL) to executable instructions implementing the action, a reference to a GUI element, a request ID, an action ID, action sequence information or the like. The action framework 218 may use the metadata 234 to access a code repository 124 for GUI elements 242 associated with the one or more suitable actions. The GUI elements 242 may be a text and an icon or a reference to each. The retrieval of GUI elements is optional. In an embodiment, the code repository is in the platform layer 206. In an embodiment, there are multiple code repositories, each corresponding to a different computer language, such as, Java, .NET and the like. Each GUI element includes information on how to access a set of executable instructions that implements the corresponding action—e.g. the location of the set of executable instructions. The action framework 220 inserts the GUI elements 242 for the action(s) into a collection (i.e., assemblage or bundle) 244. The collection 244 may include the metadata for the suitable action(s) 234 or GUI elements 242. The collection 244 is returned to the client 210 via the web application server 214 and channel 248.

A user at web browser 210 may invoke an action using the GUI elements 242 or the metadata 234 on the suitable action (s). Either of these have sufficient information to invoke a set of executable instructions that implements the action. These executable instructions may reside in the code repository 124 or elsewhere. The call is made from the web browser 210 through appropriate channels (e.g. channels 214 and 218) to the location of the executable instructions that implement the action. For example, a suitable action in viewing a report (i.e., target content) is an action to export the report to a PDF file. The executable instructions for that could be implemented by the report engine 228 or stored as a shared resource in the code repository 124. The code in repository 124 would be executed by the action framework 220. The results of the action are returned to the web browser 210 via channel 248.

In addition to requesting one or more suitable actions, the web browser 210 can send a request for target content and suitable action(s) to the web application server 216. The request is passed into the BI platform 222 where the metadata repository 120 is queried for metadata for both the target content (e.g. permissions checking, data source location) and a list of suitable actions. The BI platform 222 then retrieves the target content from one or more data sources, for example, by using report engine 228 to query data source 230. The report engine can access one or more data sources (only one shown) through a semantic abstraction that overlies the data source(s). This metadata layer includes a model that describes the underlying data. An example of a semantic abstraction is a BusinessObjects Universe™. Alternatively, the report can be retrieved from a document repository. In an embodiment the target content is data from data source 230.

The target content 232 along with metadata for the suitable action(s) 234 are returned from the BI platform 222. The action framework 218 inserts the target content 232 or a portion of the target content into a collection 244. Examples of a portion of target content include the first 100 records in a report, 5 pages in a document, a subset of a results set and the like. The collection 244 may include one or more of target content 232, the metadata for the suitable action(s) 234 and GUI elements 242. The collection 244 is returned to the client 210 via the web application server 214 via channel 248. In an embodiment, the collection is dynamically generated GUI content, such as, a page suitable for viewing in a web browser.

Several other architectures for a BI system like system 200 are associated with embodiments of the invention. The system 200 is amenable to a client-server architecture with a thin client—i.e., web browser 210. In an embodiment, two or more layers (i.e., 202, 204 and 206) may be combined. When layer 202 and 206 are combined the web browser 210 is replaced by a GUI unit and the web application server 216 is not present. Some embodiments of the present invention support a web based architecture in which each layer, repository and data source may be hosted by a separate computer. The architecture may be that of a thick client including all shown components in one layer with permissible exceptions for the data source 230 and or metadata repository 120. Another embodiment of the present invention includes a thick client in a client-server architecture.

Figure 3:
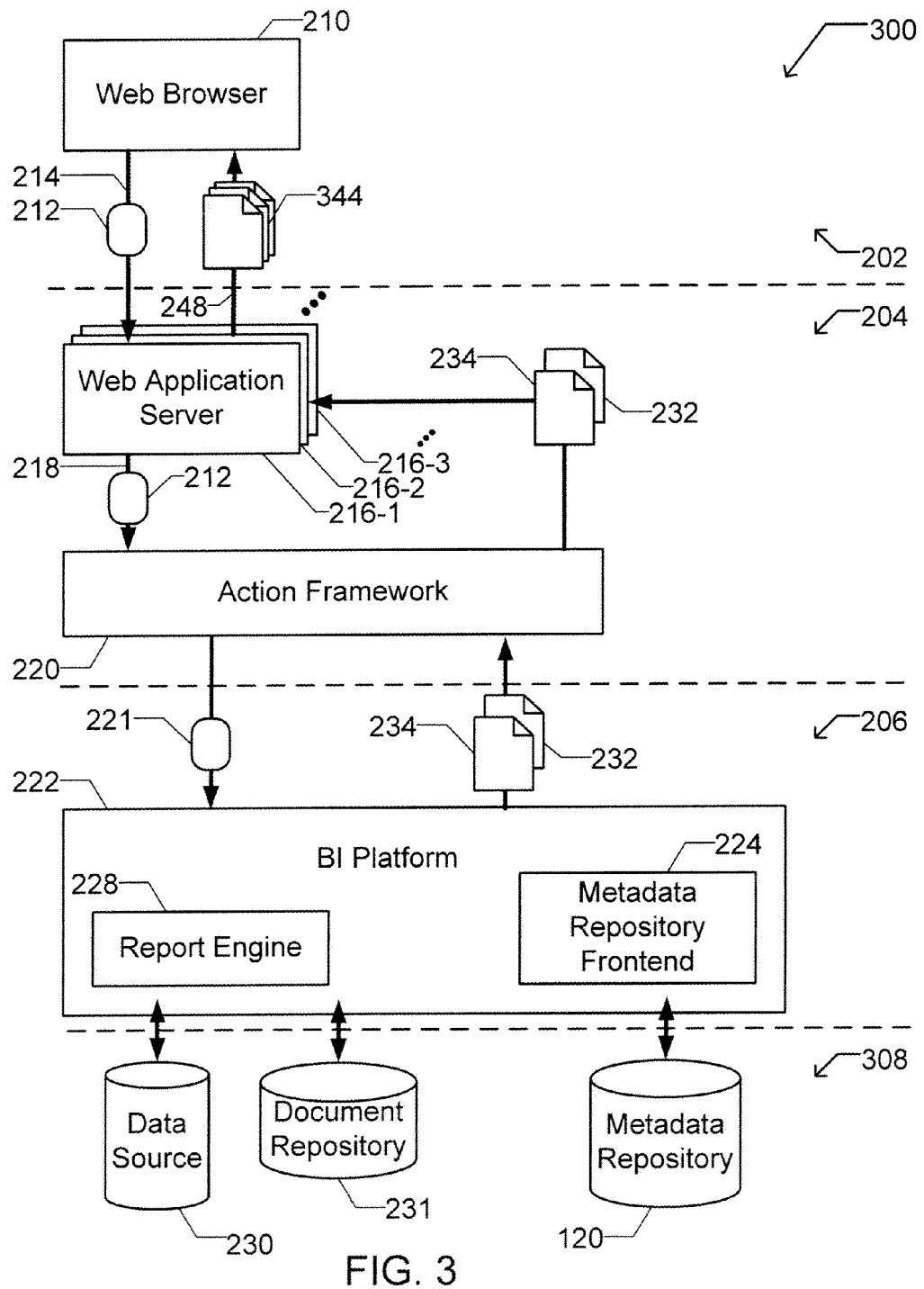
FIG. 3 is an architecture diagram of a BI system with a plurality of web application servers in accordance with an embodiment of the invention.

FIG. 3 illustrates an alternative architecture for a BI system. The BI system 300 is like BI system 200 in that it is designed in a componentized framework. BI system 300 principally differs from BI system 200 in that there are a plurality of web applications servers 216-1, 216-2, 216-3 and so on, and there is no code repository 124. An option also illustrated in FIG. 3, but applicable to system 200 as well, is an extra layer 308. The layer 308 includes the data source 230 and metadata repository 124. However, each of these could be in their own layer.

The function of system 300 differs from system 200 in how the web application servers 216 are used. As with system 200, the web browser 210 sends a request 212 for one or more suitable action via channel 214 to a default web application server for example 216-1. This request is relayed per the description of system 200. The metadata for the suitable actions 234 is returned from the BI platform 222. In an embodiment, the action framework 220 parses this metadata to select a web application server where the metadata 234 will be sent. This web application server, for example 216-2, then returns the metadata to the web browser 210. In another embodiment, the default web application server 216-1 returns the metadata 234. The web application server can package the metadata into a portion of a GUI element for display by the web browser. This GUI element the requested data 232 and the metadata 234 can be included in a package 344 which is returned to the web browser 210. The metadata 234 can be segmented by action with the metadata for each action potential being returned to a different web application server.

In an embodiment, the metadata 234 contains a portion of text naming an action, an icon for a GUI representing an action or a link to the same icon, and the URL of the code that implements the action. This URL is on a web application server accessible to the web browser 210—e.g., 216-3. In this way, different actions can be implemented by different web application servers. The division of servers can be based on programming language, application, type of action, proximity to needed resources and the like.

The BI platform 222 retrieves target content from one or more sources. The target content can come from a document repository 231. The documents in the optional document repository 231 maybe BI documents. The documents may be in many forms, such as a static document (e.g., a PDF document), a dynamic document with saved data, or a dynamic document with live data. The repository 231 may also contain folders that can be target content.

Figure 4:
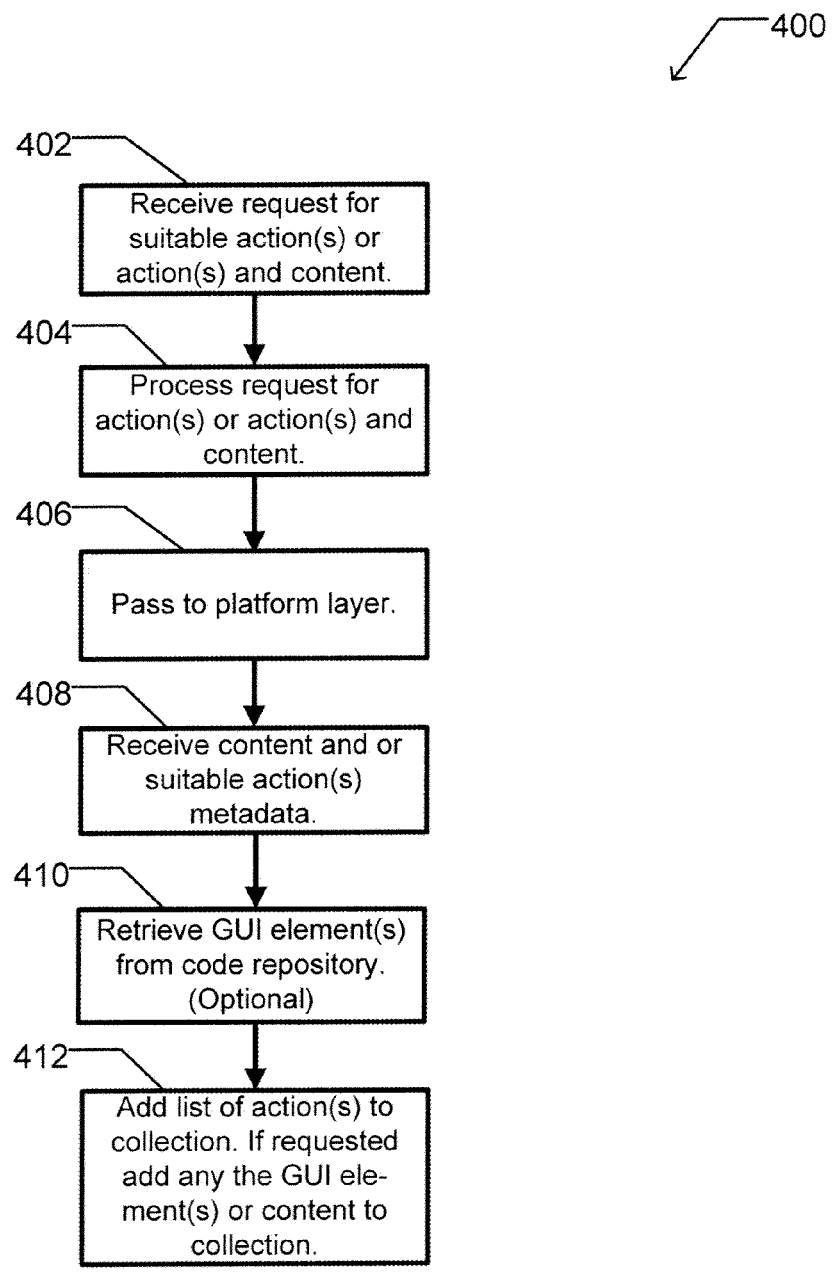
FIG. 4 illustrates processing operations for selecting actions associated with an embodiment of the invention.

FIG. 4 illustrates a set of processing operations 400 associated with an embodiment of the invention. The set of processing operations 400 are implemented in the client layer 202 and the server layer 204. The client makes a request for suitable action(s). The action framework receives the request 402. The action framework processes the request 404. This can include augmenting the request with additional metadata. For example, the action framework can add information on the computer language used to create the GUI elements in the client. Processing the request can include determining if a set of GUI elements corresponding to the list of actions is required or requested. The request is passed to the BI platform layer 406. The action framework receives the selected metadata for the one or more suitable actions 408. In an embodiment, the action metadata include URLs to the executable instructions or corresponding GUI elements of the suitable actions. Using the metadata for the suitable actions, the corresponding GUI elements can optionally be retrieved from a code repository 410. The list of suitable actions and optionally corresponding GUI elements are inserted into a collection 412. This collection is returned to the client wherein it can be displayed to the user. Processing operations 400 can be included in a loop and executed upon appropriate user input or similar invocation.

The set of processing operations 400 permit a request for content or target data (e.g., target content) to be processed concurrently with a request for one or more suitable actions. In operation 402, a request is made for content and suitable actions. The two requests are jointly processed through operations 404 to operation 408 when both the content and the metadata for suitable actions are retrieved from the platform. The optionally requested content is inserted into the collection in operation 412. For example a JSP page is created that displays a report as target content and suitable actions that may be performed on the report.

Figure 5:
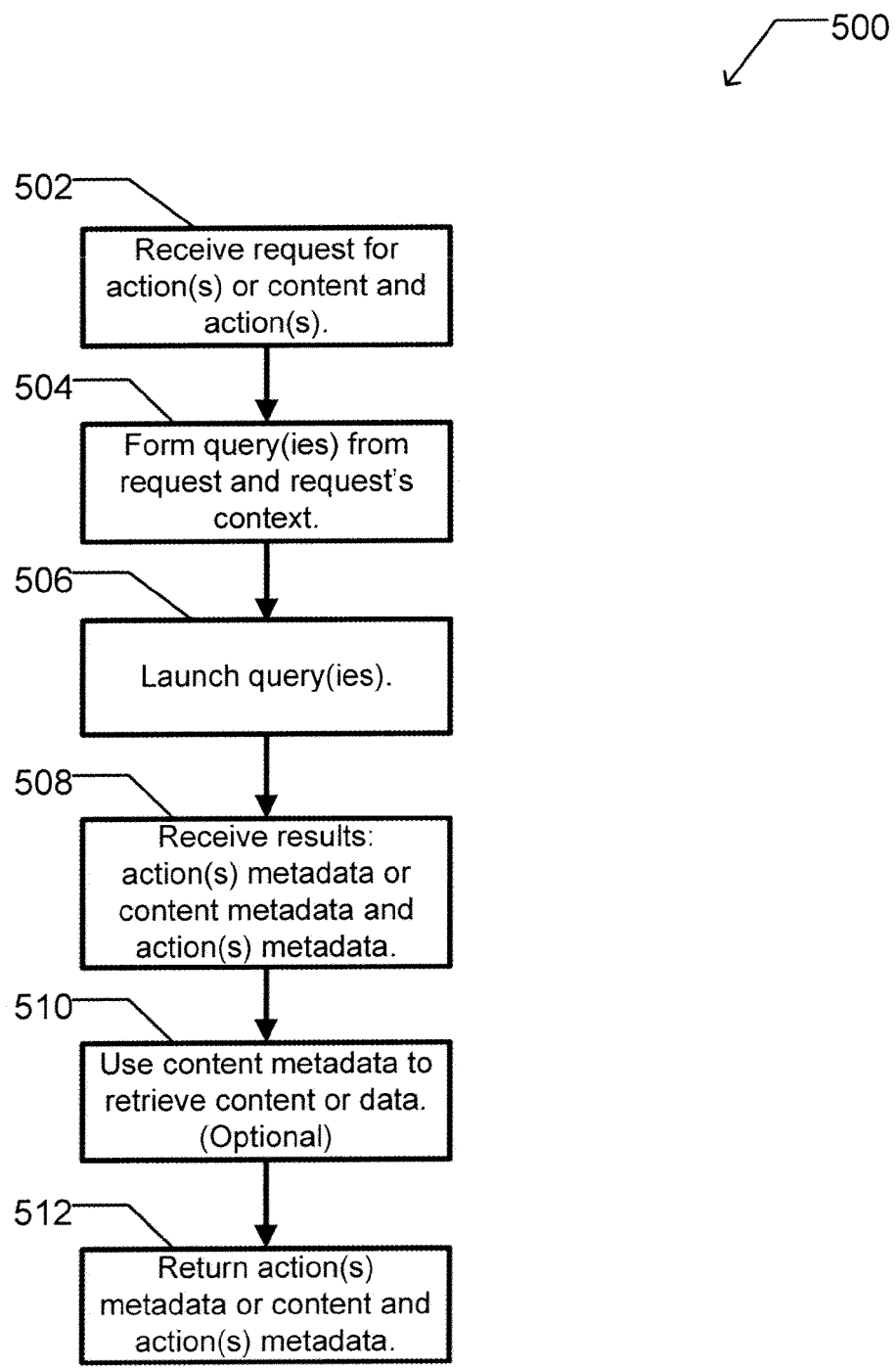
FIG. 5 illustrates processing operations for querying a metadata repository for suitable actions to make available to a user in accordance with an embodiment of the invention.

FIG. 5 illustrates a set of processing operations 500 within BI platform layer 206. The BI platform receives a request for one or more suitable actions or suitable actions and content 502. The BI platform, invoking executable instructions from the BI module 114 and the action module 122 forms a set of queries 504. The set of queries is formed from the request and the context of the request. The query or queries of the set are sent to the metadata repository 506. Received are one or more sets of results 508. The results include selected metadata to the requested target content—if requested. The results include metadata for a list one or more suitable actions. For each action, metadata can include the location of a set of executable instructions to the suitable action. The metadata can also include the location to a set of GUI elements corresponding to the executable instructions to the suitable actions. If requested, the platform uses the content metadata to retrieve content 510. If the content in operation 510 is data, the data is processed into the target contents. The metadata for suitable action(s) or metadata for suitable action(s) and the content is returned 512. In an embodiment, two or more requests are received. Each of these is turned into a query. These queries are processed separately and their results aggregated. A collection of result sets is returned.

The processing operations in FIGS. 4 and 5 support the invocation of actions. For example, while viewing a report document (e.g., previously requested target content, target content retrieved from another system) the user may select a print button (i.e., a suitable action previously identified). The print button's logic is implemented as an action. The current context (i.e., report document, invocation of print and the like) is forwarded to the executable instructions associated with the report printing action. Because the print action has sub-actions, further actions are requested based on the context of the report document and the invocation of the print action. Parameters, such as the ID of the target report document, are used to query the metadata repository for metadata for the print action and the report document per processing operations 506 and 508. The metadata for the print action is used to retrieve the GUI element per processing operation 410. The GUI element for the action is combined with the report document to render a page (e.g., JSP page) showing the print action and the report. This page is displayed to the user. The user optionally inputs a parameter such as the number of copies and hits the OK button.

The action framework queries for the report document's information object. If needed, the metadata for the report or action is updated. The executable instructions for the actual print operation are executed. The metadata to the action or report document is updated to reflect the execution of the print action.

Figure 6:
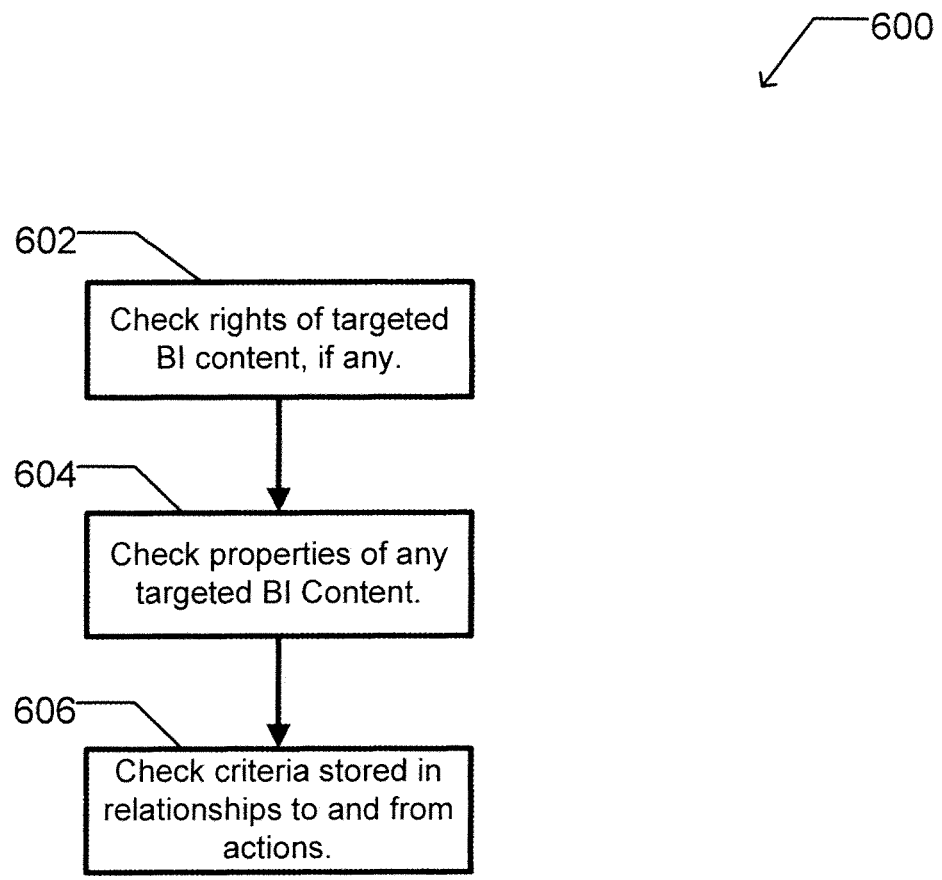
FIG. 6 illustrates processing operations to evaluate a query and determine a set of suitable actions in accordance with an embodiment of the invention.

FIG. 6 illustrates a set of processing operations 600 performed by the action module 122 to determine a set of suitable actions. Each processing operation in the set of processing operations 600 is optional. Further, the order of operations in set 600 is arbitrary. The action module 122, checks the rights of any target content 602. Target content includes the content requested in processing operation 402 of FIG. 4 or any set of content that is specified as a target for the requested list of suitable actions. Rights are often interconnected and checking rights involves resolving one or more layers of rights. Resolution of a layer of rights can be a sub-operation of operation 602. For example, if the user is viewing a list of documents that includes a report document, the action module 122 checks if the user has the system view right on that report. Rights checking includes querying the metadata source for metadata to an application for the target content. For example, the action module 122 can check if the user has permission to edit a report. Other types of rights are found in system properties. These can include rights like those encoded in software vendor keycodes. An example of checking system rights is confirming if BI system (e.g. system 200) has a valid keycode for Crystal Reports™.

Action module 122 checks properties of any target content 604. The metadata source is checked for specific properties in the metadata for the target content. An example of checking specific properties is confirming the report document properties with the metadata associated with the report. If the report has prompts, the framework knows these prompts need to be displayed to the user so they can set them. The prompts can be set in subsequent actions.

In processing operation 606, the action module 122 checks criteria stored in metadata as to how actions relate to data, applications, situations, and the like. In an embodiment, this criteria is stored as the relationships between action information objects and other information objects. The metadata repository 120 stores information objects and relationships between them. These objects and relationships indicate which actions are suitable in the given context based on: the type of target content, the application consuming the target content, the usage or genus of the actions, and the situation of the target content.

Figure 7:
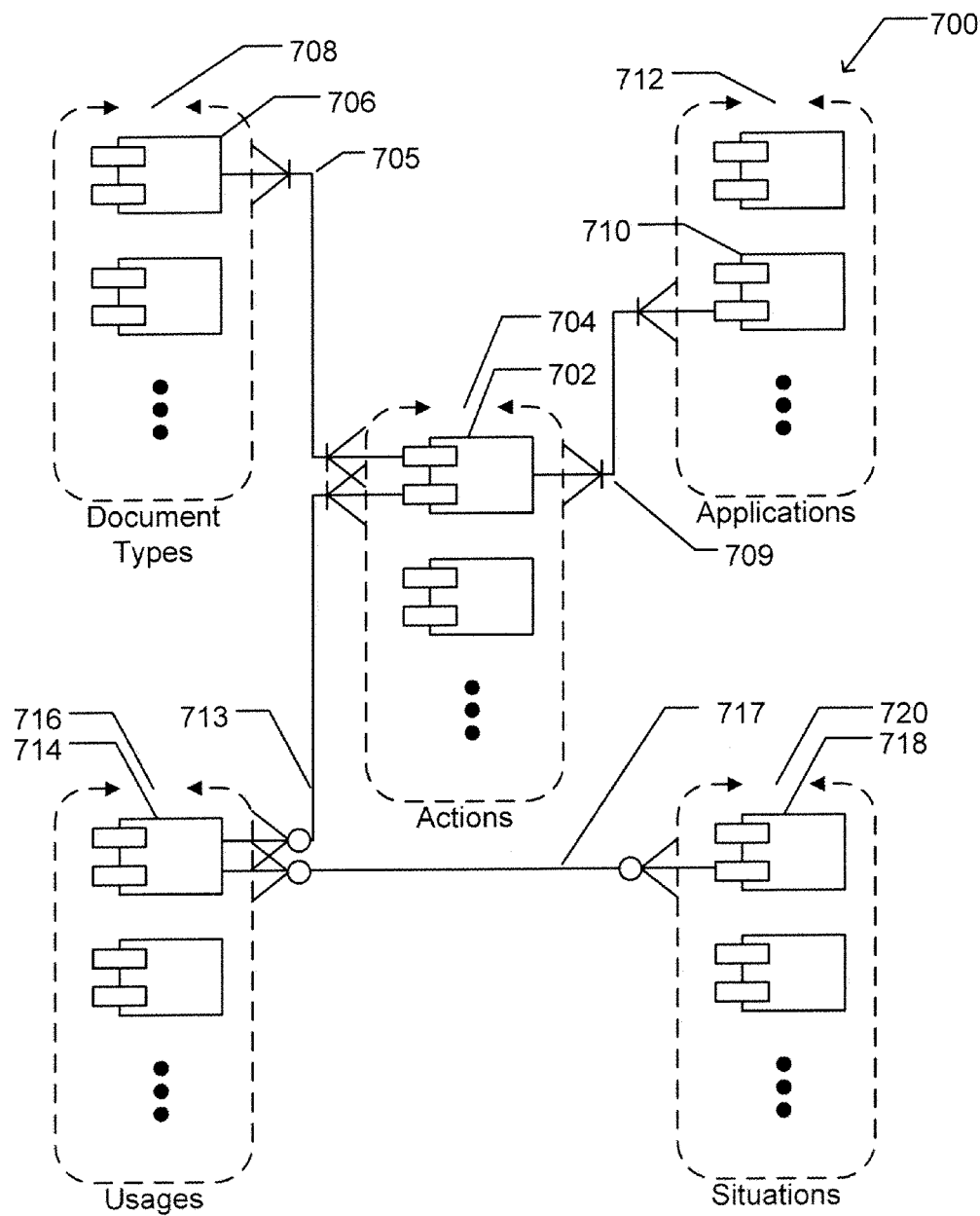
FIG. 7 illustrates a set of relationships between information objects in accordance with an embodiment of the invention.

FIG. 7 illustrates a set of information objects and relationships 700 between them in accordance with an embodiment of the invention. The set of information objects and relationships 700 is used to determine suitable actions on existing components in a BI system. Included in the set 700 is a group of action information objects 704. The group of action information objects 704 includes a representative action information object 702. The representative action information object 702 is coupled to a representative document type 706 in a group of document types 708. As shown, by relationship 705 there can be one or more document types 708 related to one or more actions 704. The group of document types 708 includes a plurality of information objects defining different document types, for example, BI documents, dynamic documents like reports, static documents, document packages, schedules, process forms, jobs (e.g., business process jobs, extract-transform-and-load jobs, data cleanse jobs), analytics, dashboards and the like. The document types characterize in part the target data of the actions. The representative action information object 702 is coupled via a second relationship 709 to a representative application information object 710 in the group of application information objects 712. There may be one or more applications 712 related to one or more actions 704. The application information objects 712 define different BI applications, for instance, a report generation or viewing application, such as one sold by Business Objects of San Jose, Calif., including Crystal Reports™, BusinessObjects Voyager™, BusinessObjects Web Intelligence™, and the like. The application could be an information portal like, BusinessObjects InfoView™, or equivalent.

Two further relationship types are depicted in set 700. The representative action information object 702 is coupled via a third relationship 713 to a representative usage information object 714 in the group of usage information objects 716. The group of usage information objects 716 includes a plurality of information objects defining different usages of actions. A usage is a genus to an action such as default, list, create/new, upload, refresh, schedule, organize and the like. Usage can be used to group actions together in the user interface. There may be zero, one or more usages 716 related to one or more actions 704. The representative usage information object 714 is coupled via a fourth relationship 717 to a representative situation information object 718 in the group of situation information objects 720. The situation information objects 720 define different spatial or logical situations that an action can be invoked from. Examples of situations include: the logical relation of an information object with another information object, the logical location of the proposed action (e.g., categories, folders, inboxes, object package) and the like. The situation information object can include further information such as temporal circumstance and the like. As shown, in relationship 717, there may be zero, one or more usages 716 related to zero one or more situations 720.

The set of entities and relationships 700 is used to determine suitable actions on existing components in a BI system. For example, editing or viewing an existing document. The metadata in FIG. 7 is not relied upon when adding a component. Although adding a document type will include updating the group of document types 708. There are some actions that are not document focused. These do not use the set of information objects and relationships 700. For example, the action that displays the version number of an application is not specific to a document type.

Alternative relationships to those shown in FIG. 7 are possible. In an embodiment, two or more relationships extend from an action information object to two or more information objects in a group of information objects. For example, an action information object commonly is linked to a plurality of application information objects in the group of application information objects 712. This is because it is common for an action to be designed for a plurality of applications. Some actions have fewer than four relationships. For example, if an action is unrestricted as to usage, it needs no relationship with a usage information object in the group of usage information objects 716.

As shown, in FIG. 7, a set of suitable actions can be determined by examining relationships between information objects in a metadata repository. The set 700 can be implemented in many different data sources. In an embodiment, a relational database is used. In an alternative embodiment, the information objects are replaced by records in tables in a data source with a relational schema. These records can be linked through the relational schema.

Figure 8:
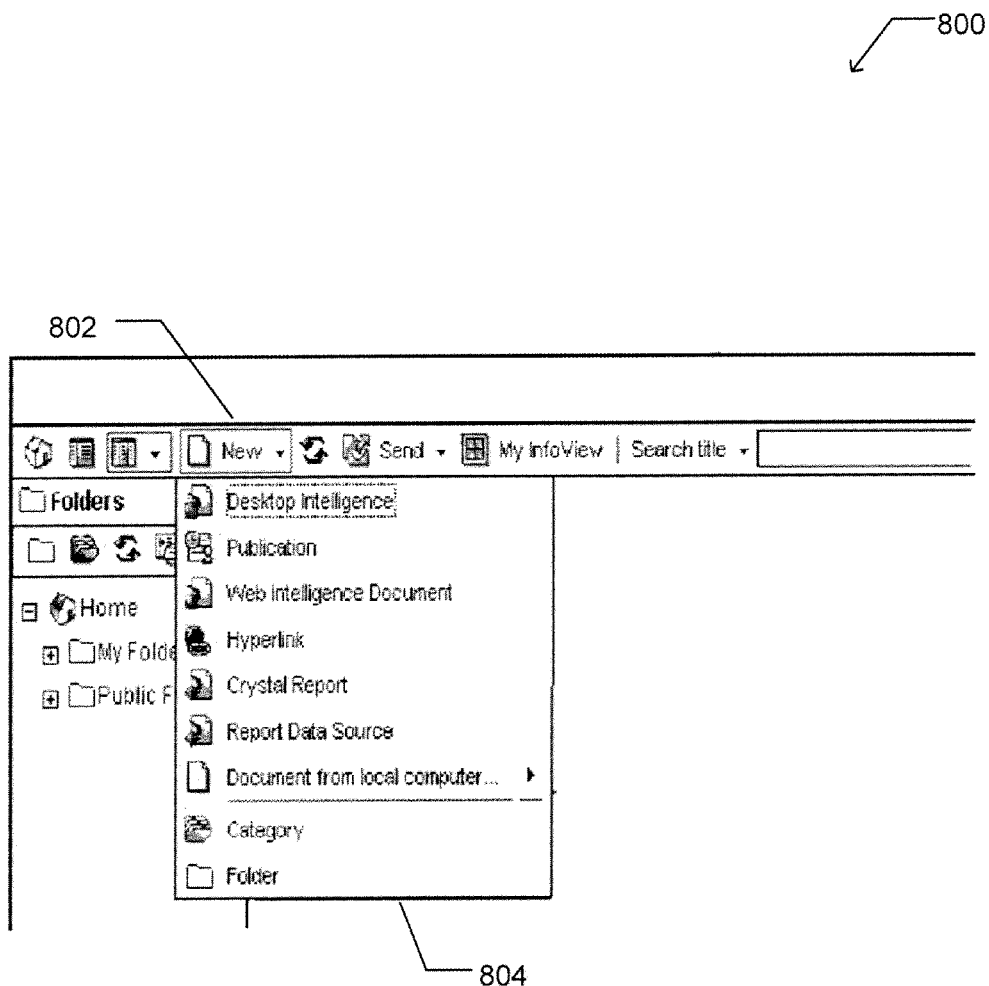
FIG. 8 illustrates a GUI of an application displaying a page with content and a suitable action associated with an embodiment of the invention.

FIG. 8 illustrates an example of an interface 800 displaying a page with content and suitable actions associated with an embodiment of the invention. Interface 800 can be generated by the web browser module 132 in conjunction with the action module 122, and BI module 114, and an action code repository 124. Interface 800 could be displayed in a window on an output device connected to computer 100 such as a display. Interface 800 includes standard GUI elements such as windows (divided into panes), icons, menus and the like.

The specific GUI elements of interface 800 are generated in accordance with embodiments of the present invention. In this case, interface 800 is associated with retrieving a set of suitable actions for creating a new object in a BI system. By clicking on the "New" button 802 the interface 800 displays a list of suitable actions 804. Each action in the set 804 is selected because it is suitable for at least the "New" usage and the application embodied in interface 800. In this way, the interface 800 is scalable with the rights of a user. More actions are available depending on the user's rights. These rights are determined by querying the metadata in the system in accordance with the operation in FIG. 6. In an embodiment, each action listed in the list of suitable actions 804 is represented by a GUI element retrieved from a code repository. In an embodiment, the list of suitable actions 804 is a pre-existing GUI element whose content is populated with action from a list of suitable actions. The incorporation of action metadata to alter a GUI includes enabling and disabling buttons and other controls, changing the text associated with a control, changing the executable instructions associated with a control, and the like.

Figure 9A:
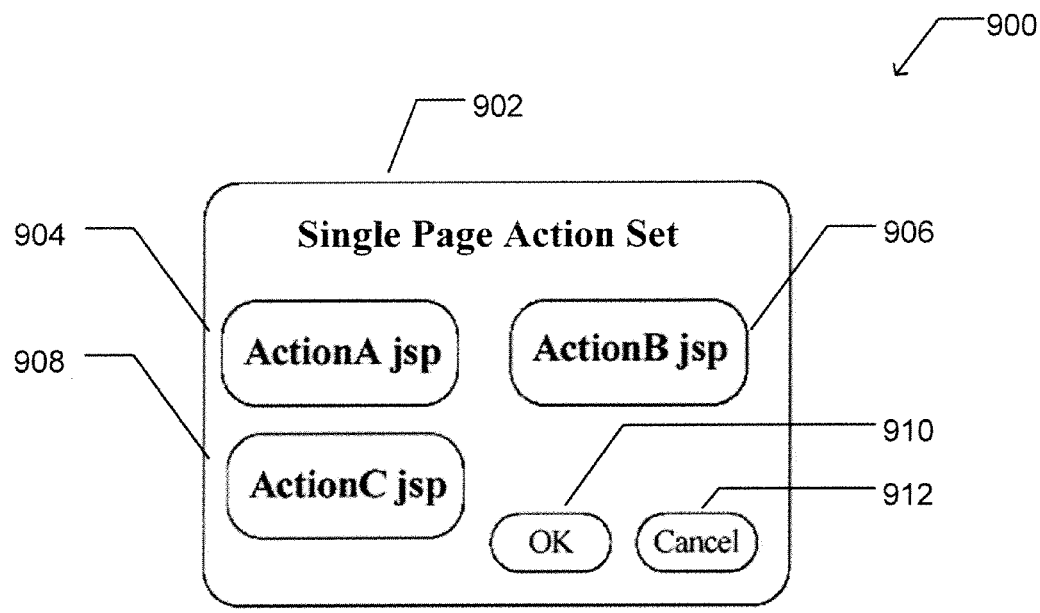
FIG. 9A illustrates a single page action set in accordance with an embodiment of the invention.

FIG. 9A illustrates a single page action set 902 in accordance with an embodiment of the invention. To the user a single page action set 902 looks like a single page with embedded UI controls 904-912. A user can interact with the embedded actions in any order. As shown, "Action A", "Action B" and "Action C" are depicted as controls 904, 906 and 910 on in page 902. Also included are an OK button 910 and a cancel button 912.

Figure 9B:
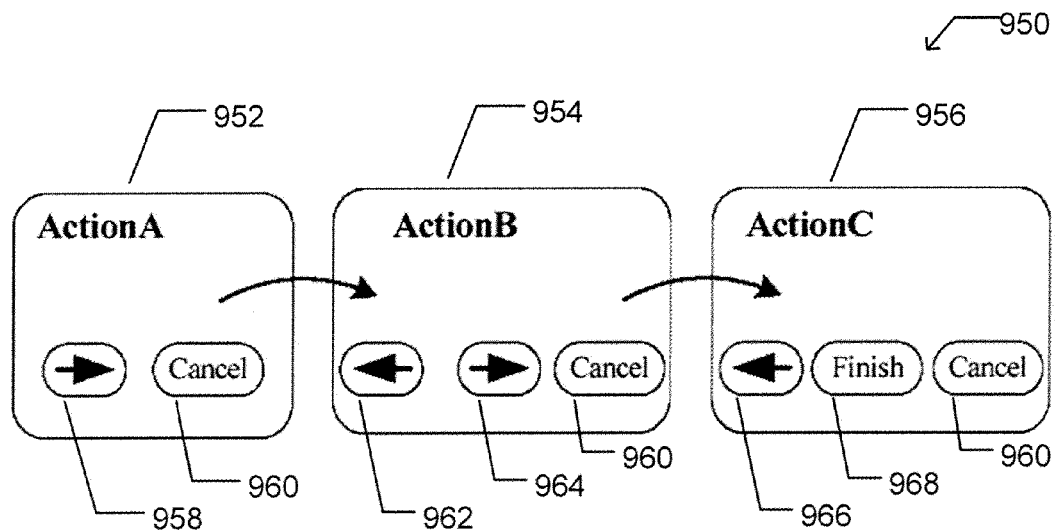
FIG. 9B illustrates a multi-page action set in accordance with an embodiment of the invention.

FIG. 9B illustrates a multi-page action set 950 in accordance with an embodiment of the invention. To the user, the multi-page action set 950 could look like a wizard. Each action is displayed on its own page, and previous, next, cancel and finish buttons are rendered as required. As shown, "Action A", "Action B" and "Action C" are depicted on in pages 952, 954 and 956. Page 952 includes controls (e.g., button, textbox, combobox) needed for the action, a next button 958 and a cancel button 960. Page 954 includes needed controls (not shown), a back button 962, a next button 964 to advance to page 956 and the cancel button 960. Page 956 includes needed controls for Action C (not shown), a back button 966, a finish button 968 and the cancel button 960.

Each action in the action sets is selected because it is a suitable action given the context. In an embodiment, each page in a multi-page action set includes one or more actions. Each action shown in FIGS. 9A and 9B is schematic. In implementation each action includes the necessary GUI elements and controls needed for the action. That is in processing operation 410 the GUI elements retrieved from a code repository—e.g., code repository 124 of FIG. 2.

Figure 10:
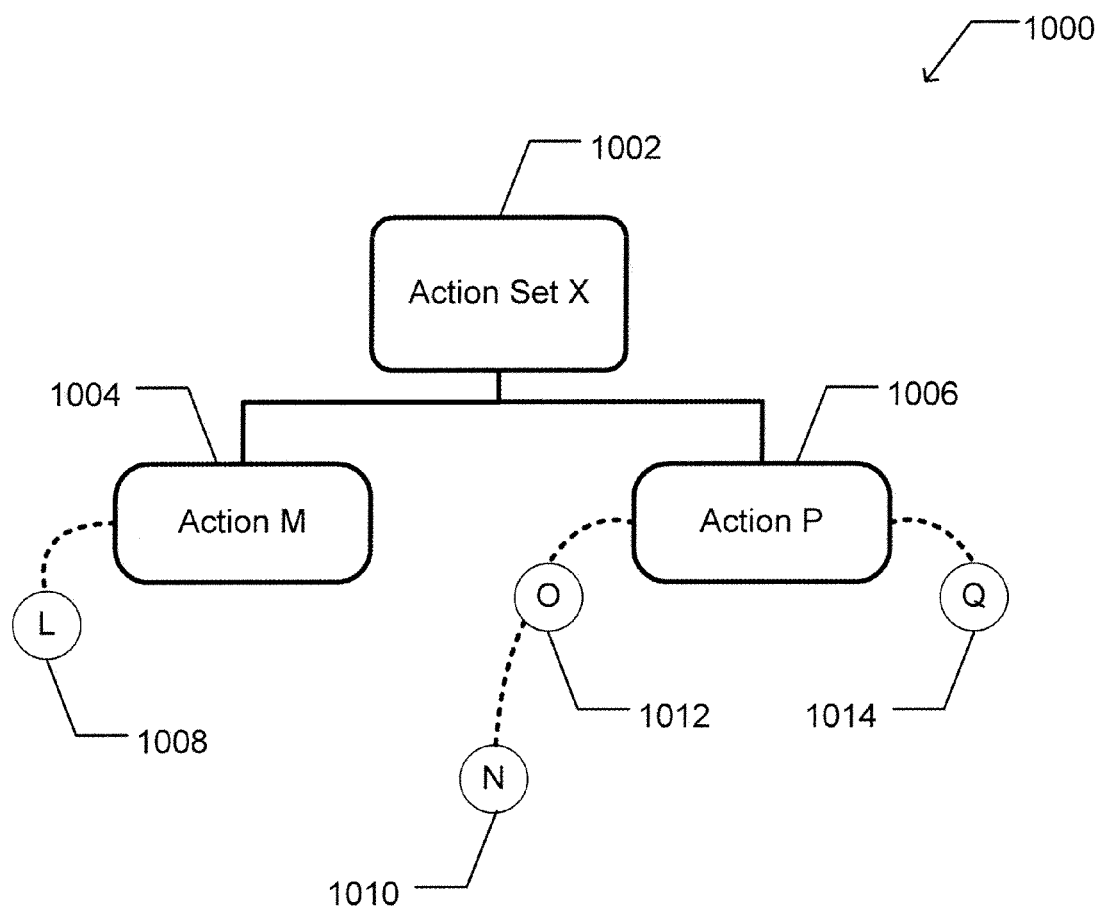
FIG. 10 illustrates chained actions in accordance with an embodiment of the invention.

FIG. 10 illustrates chained actions in accordance with an embodiment of the invention. The set of actions 1000 are contained in the "Action Set X" 1002. Action Set X contains two visible actions "Action M" 1004 and "Action P" 1006. Each displayed action may have a chained action. A chained action is an action that is executed based on the execution of another action but that is not visible to the user. As shown, actions "L", "N", "O" and "Q" are chained actions. For example, a user invokes Action Set X. Assuming Action Set X is a multi-page action set it forwards control to chained Action L 1008. Action L executes itself, then forwards control to Action M. Action P displays its UI to the user. Chained actions can occur before a visible action (e.g., chained Action N 1010 and chained Action O 1012) or after (e.g., chained Action Q 1014). Chained actions are an example of actions without corresponding GUI elements.

Actions in an action set and actions in a chain are managed by the action sequence module 126 in conjunction with the action module 122 and the metadata repository 120. The action sequence module 126 can be designed according to well known design patterns such as the Chain of Responsibility, Strategy and Mediator patterns or variations thereof. All promote loose coupling of parts of the module and allow a request to be passed from object to object until serviced.

In an embodiment, actions in an action set and actions in a chain use an information object to pass information between them. This delta information object is created by the action set or by the first action in the chain. Each action when invoked may query the metadata repository (i.e., repository 120 in FIG. 2) for the delta object. Each action will use the delta object and when finished commit the object with any changes back to the repository.

Herein, when introducing elements of embodiments of the invention the articles "a", "an", "the" and "said" are intended to mean that there are one or more of the elements. The terms "comprising", "including" and "having" are intended to be inclusive and to mean that there may be additional elements other than the listed elements.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:

supply, by an action framework to a client, a graphical user interface element with an embedded control, which when activated, invokes an action with an associated workflow performed by executable instructions, the workflow comprising a plurality of actions, the action framework being interposed between the client and a business intelligence (BI) platform;

identify, by the action framework, activation of the embedded control in the client by receiving a request from the client;

augment, by the action framework, the action with an action context characterizing a set of conditions under which the action is requested;

receive, by the BI platform from the action framework, the action context;

search, a metadata repository of the BI platform, a set of metadata for metadata corresponding to the action, wherein the search is limited by the action context;

insert, by the action framework, selected metadata for the action from the BI platform into a collection of graphical user interface elements, wherein: the selected metadata results from searching the set of metadata, the selected metadata includes: a reference to the set of executable instructions that implements the action, and a description of the action;

return, to the action framework to the client, the collection of graphical user interface elements; and receive, by the action framework from the client, an interaction with the collection of graphical user interface elements that invokes the set of executable instructions to perform the workflow.

2. The computer readable storage medium of claim 1 further comprising executable instructions to define a metadata repository including the set of metadata.

3. The computer readable storage medium of claim 2 wherein the metadata repository includes an action information object associated with a set of information objects.

4. The computer readable storage medium of claim 3 wherein the action information object is linked to another information object in the set of information objects selected from: a document type information object, an application information object, a usage information object, and a situation information object.

5. The computer readable storage medium of claim 1 wherein the metadata for the action includes a location of the set of executable instructions that implements the action.

6. The computer readable storage medium of claim 5 wherein the location is within a name space that spans a plurality of web application servers.

7. The computer readable storage medium of claim 1 further comprising executable instructions to:
receive a request for a target set of data, wherein the target set of data is a target for the action;
search the set of metadata for metadata for the target set of data;
retrieve the target set of data; and
insert the target set of data in the collection of graphical user interface elements.

8. The computer readable storage medium of claim 7 wherein the target set of data is a document with business intelligence content.

9. The computer readable storage medium of claim 1 wherein the action context is determined by two or more pieces of information selected from: a target set of data, a set of metadata for the target set of data, a set of rights for a user, a usage of the action, a situation of the target set of data, a previously invoked action, and a computer language of the application requesting the action.

10. The computer readable storage medium of claim 1 wherein:
the action is included in a plurality of actions; and
the plurality of actions form an action set of related actions.

11. The computer readable storage medium of claim 10 wherein: each action in the action set has a corresponding graphical user interface element; and each corresponding graphical user interface element is concurrently presented in a graphical user interface.

12. The computer readable storage medium of claim 10 wherein: each action in the action set has a corresponding graphical user interface element; and each corresponding graphical user interface element is presented over a set of sequential portions of a graphical user interface.

13. The computer readable storage medium of claim 1 further comprising executable instructions to insert a graphical user interface component in the collection of graphical user interface elements, wherein the graphical user interface component corresponds to the graphical user interface element.

14. The computer readable storage medium of claim 12 further comprising executable instructions to construct a graphical user interface instance including the collection of graphical user interface elements, for presentation to a user.

15. A non-transitory computer readable storage medium, comprising executable instructions to:
supply, by an action framework to a client, a graphical user interface component with an embedded control associated with an action defined by a workflow performed by executable instructions, the action framework being interposed between the client and a business intelligence (BI) platform;
identify, by the action framework activation of the embedded control by a user at the client, wherein the activation invokes the action in an action context, wherein the action comprises the workflow performed by executable instructions in a software application and the action context characterizes conditions associated with the software application, the workflow comprising a plurality of actions;
augment, by the action framework, the request with an action context characterizing a set of conditions under which the action is requested;
form, by the BI platform, a query to a metadata source for the action, wherein the query includes:
a first parameter based on the rights of the user, and
a second parameter based on a criterion in a request for the action;
receive, by the action framework from the BI platform, a set of results from the query, wherein the set of results from the query includes metadata for a suitable action;
retrieve, by the action framework, a graphical user interface element using the metadata for the suitable action;
insert, by the action framework at the client, the graphical user interface element into a portion of a graphical user interface that is used to invoke the workflow performed by the executable instructions; and
return, by the action framework a the client, the metadata and the graphical user interface.

16. The computer readable storage medium of claim 15 wherein the request specifics target content.

17. The computer readable storage medium of claim 16 wherein the target content is selected from: a document, a folder, a document with saved data, and a document with live data.

18. The computer readable storage medium of claim 16 wherein the first parameter is based on the user's rights to access the target content.

19. The computer readable storage medium of claim 16 further comprising executable instructions to form a portion of the query based on the properties of the target content.

20. The computer readable storage medium of claim 15 wherein the metadata source is a metadata repository.

21. The computer readable storage medium of claim 20 wherein the metadata repository includes a set of information objects, wherein each information object describes a component in a system.

22. The computer readable storage medium of claim 15 wherein the first parameter is based on the user's rights to access an application.

23. The computer readable storage medium of claim 15 wherein the criterion specifies the action be suitable for an application.

24. The computer readable storage medium of claim 15 wherein the criterion specifies the action be suitable for a specified usage.

25. The computer readable storage medium of claim 15 wherein the criterion specifies the action be suitable for a specified situation.

26. The computer readable storage medium of claim 15 wherein the criterion specifies the action be suitable for a specified BI document type.

* * * * *